Feb. 6, 1962    J. W. ROSENKRANDS    3,020,061
SWING AXLE REAR SUSPENSION
Filed Jan. 11, 1960    2 Sheets-Sheet 1

INVENTOR.
Johannes W. Rosenkrands
BY
W. F. Wagner
ATTORNEY

INVENTOR.
Johannes W. Rosenkrands
BY
W. F. Wagner
ATTORNEY

United States Patent Office

3,020,061
Patented Feb. 6, 1962

1

3,020,061
SWING AXLE REAR SUSPENSION
Johannes W. Rosenkrands, Detroit, Mich., assignor to General Motors Corporation, Detroit, Mich., a corporation of Delaware
Filed Jan. 11, 1960, Ser. No. 1,590
8 Claims. (Cl. 280—104)

This invention relates to vehicle suspension and more particularly to independent swing axle suspension for vehicle driving wheels.

Of the various forms of independent suspension already known, the simplest and most inexpensive type is the so-called swing axle wherein each driving wheel is rotatably mounted on a transversely extending control arm, the inboard end of which is hinged to the vehicle sprung mass on a generally longitudinally extending axis which intersects the geometric center of the universal joint connection at the inboard end of the wheel driving live axle. While this arrangement possesses very definite advantages in terms of simplicity and economy, heretofore a severe limiting factor existed owing to the fact that the wheel deflection was limited to the single axis of motion defined by the hinge connection of the inboard end of the wheel control arm. As a result, conventional swing axle suspension in which this axis of motion was inclined so as to counteract acceleration squat inherently produced an oversteer condition and, conversely, when the axis of motion was inclined so as to produce understeer, aggravated aceeleration squat occurred.

An object of the invention is to provide an improved swing axle suspension.

Another object is to provide a swing axle independent suspension which is constructed and arranged so as to provide acceleration squat resistance under conditions of parallel ride deflection and understeer under conditions of roll deflection.

Still another object is to provide a swing axle suspension having wheel control arms which are pivotally mounted on the vehicle sprung mass in such a way as to provide a variable inclination effective axis of wheel motion, change of inclination of such axis being effected solely by transition from parallel ride deflection to roll deflection, and vice versa.

A further object is to provide an arrangement of the stated character wherein the effective axis of wheel motion, under conditions of parallel ride deflection, slopes downwardly toward the rear, while under conditions of roll deflection the effective axis of wheel motion slopes downwardly toward the front.

A still further object is to provide a swing axle suspension wherein each wheel control arm has longitudinally spaced inboard ends, the forward ends of which are pivoted directly to the vehicle sprung mass at laterally spaced points, the rearward ends being pivotally connected together independent of the sprung mass, connection of the rearward ends with the sprung mass being accomplished by vertically extending divergent links which intersect at a point colinear with the vehicle longitudinal center line.

These and other objects, advantages, and features of the invention will become more fully apparent as reference is had to the accompanying specification and drawings wherein.

Figure 1:
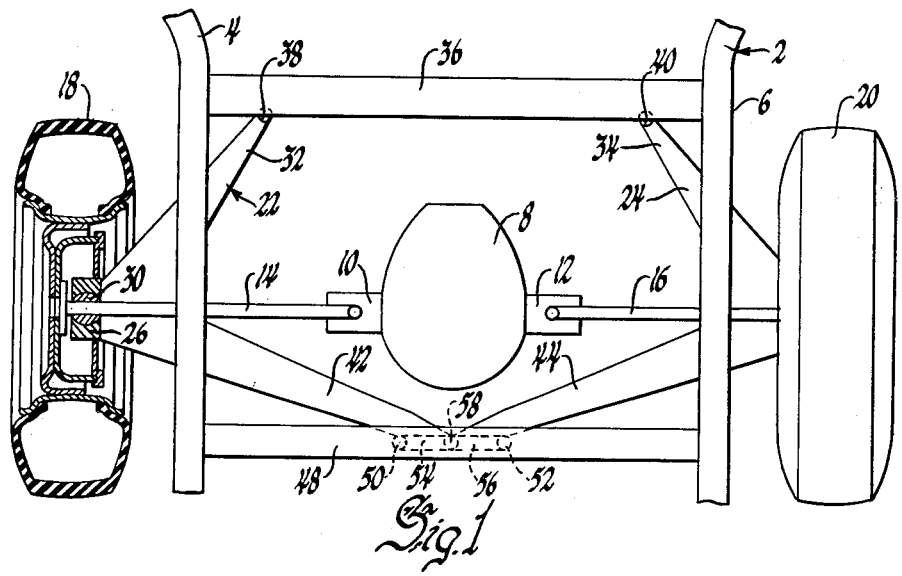
FIG. 1 is a diagrammatic plan view of the rear portion of a vehicle utilizing suspension in accordance with the invention.

Referring now to the drawings and particularly FIG. 1, the reference numeral 2 designates generally the frame or sprung mass of a vehicle. Disposed generally transversely midway between frame side rails 4 and 6 is a conventional differential drive unit 8 which is supported on the sprung mass in any convenient manner. Assembly 8 includes a pair of oppositely transversely extending output members 10 and 12 which are universally connected to the inner ends of transversely oppositely extending wheel driving axles 14 and 16. At their outer ends, axles 14 and 16 are rigidly connected to traction wheels 18 and 20.

Figure 2:
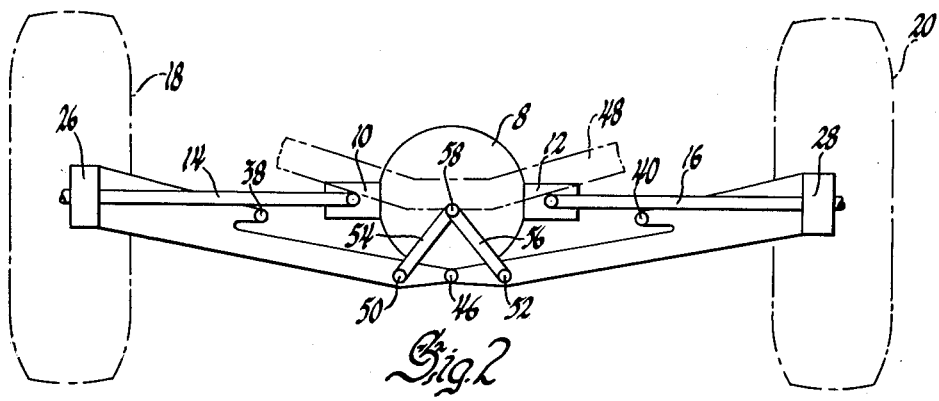
FIG. 2 is a rear end elevation of the construction shown in FIG. 1.

In accordance with the general features of the invention, wheels 18 and 20 are supported relative to sprung mass 2 by a pair of wishbone type laterally oppositely extending rigid control arms 22 and 24, respectively. At their outer ends, arms 22 and 24 are provided with integral hub portions 26 and 28 in which are carried spherical bearings 30. Bearings 30, in turn, rotatably support the outer ends of axles 14 and 16 while allowing limited angular displacement therebetweetn. The forward projecting legs 32 and 34 of control arms 22 and 24, respectively, are pivotally connected directly to frame cross member 36 by ball joints 38 and 40. The inner extremities of the rearwardly projecting legs 42 and 44, in turn, are pivotally connected together independently of the sprung mass of the vehicle by a pin joint 46. As seen best in FIG. 2, pin joint 46 is located somewhat below the level of rear cross frame member 48 and the level of live axles 14 and 16. Slightly laterally outwardly of pin joint 46, each rearward leg 42 and 44 has pivotally connected thereto by pin joints 50 and 52, respectively, the lower ends of a pair of vertically extending upwardly convergent links 54 and 56, the upper ends of which are connected together and to the cross member 48 by a common pivotal connection 58.

As will be apparent from FIG. 1, vertical deflection of either wheel 18 or 20 will cause the associated control arms 22 and 24, respectively, to deflect about an imaginary axis which extends diagonally of the vehicle and passes through ball joints 38 or 40, respectively. However, upon observation of FIG. 2, it will be seen that deflection of either wheel may cause pivotal movement of the rearward legs of control arms 22 and 24 about pivots 50 and 52, respectively, or cause both rearward legs to pivot with respect to common pivot 58, depending entirely upon whether wheel deflection is caused by parallel deflection of the sprung mass or roll motion thereof. In the case of the parallel deflection of the sprung mass, both control arms swing vertically through equal angles with the result that arm 22 swings upwardly with respect to the vehicle frame about pivot 50, while arm 24 swings upwardly with respect to the vehicle frame about pivot 52. Therefore, under parallel ride deflection, the imaginary axis A for arm 22 passes through ball joint 38 and rearward pivot 50 while for arm 24 the corresponding axis passes through ball joint 40 and rearward pivot 52. By reference to FIG. 3, it will be seen that the imaginary axis A slopes downwardly toward the rear. Since wheel 18 deflects along a path substantially perpendicular (as seen in side elevation) to this imaginary axis, upward deflection of the wheel takes place along a path slanting upwardly and rearwardly and thus develops in the known manner a force counteracting the tendency of the sprung mass to squat during acceleration.

Figure 3:
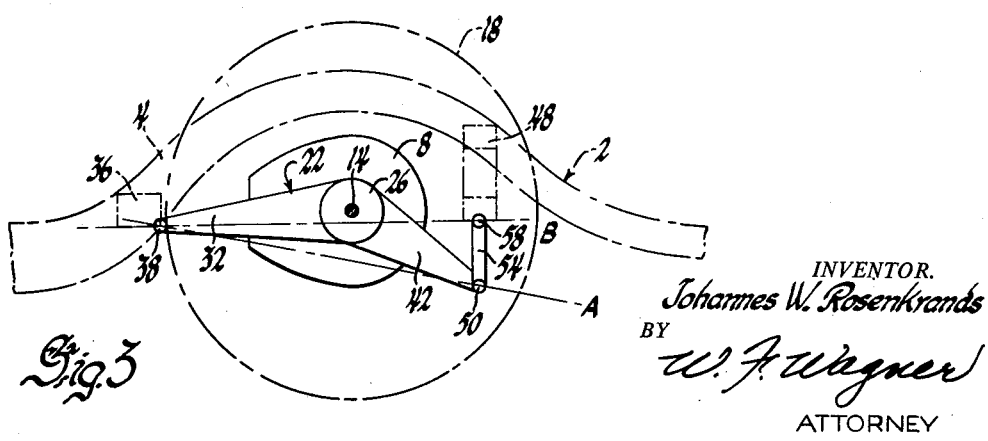
FIG. 3 is a side elevation of the construction of FIGS. 1 and 2.

Returning now to FIG. 2, in the case of roll deflection of the sprung mass, frame 2 is free to rock laterally relative to the rearward ends of both control arms 22 and 24 about the axis of common pivot 58. Therefore, under conditions of roll deflection, a new imaginary or effective axis B for arm 22 occurs which extends between pivot 38 and common pivotal connection 58, while the corresponding axis for arm 24 extends between pivot 40 and common pivot 58. In FIG. 3 it will be observed that the vertical location of common pivot 58 is above the vertical level of forward pivot 38 and, therefore, the effective axis B slopes downwardly toward the front. Since, as previously stated, the wheel moves along a path substantially perpendicular with the axis of motion, it will be apparent that wheel 18 will move forwardly relative to the input end of live axle 14 as the wheel rises. Accordingly, upward deflection of arm 22 induced by roll motion of the sprung mass will cause wheel 18 to "toe in" and thereby produce a rear wheel steer angle which tends to steer the vehicle out of the turn causing the roll condition. It will be apparent that coincidental downward deflection of the arm 24 during the roll condition will reverse the deflection path of wheel 20 and cause it to "toe out." Hence, both rear wheels will assume a slight understeer angle.

Figure 4:
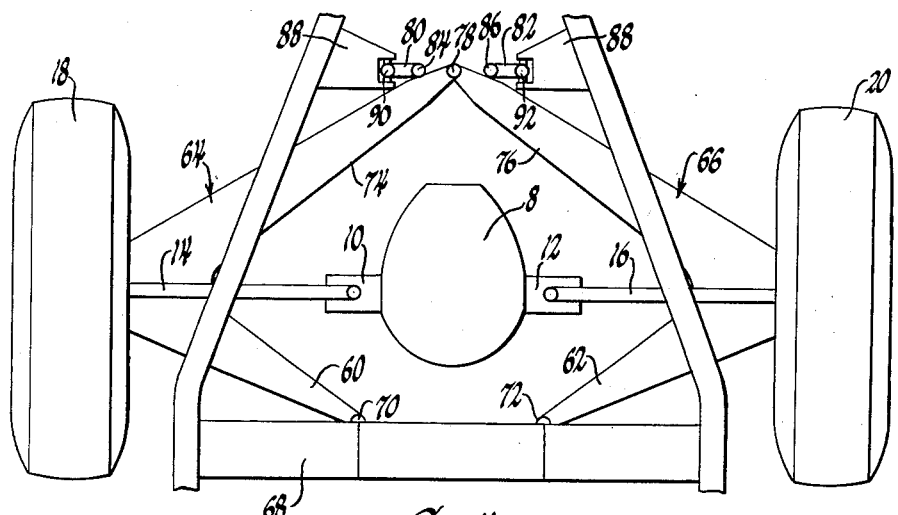
FIG. 4 is a view similar to FIG. 1 showing a modified form of the invention.
Figure 5:
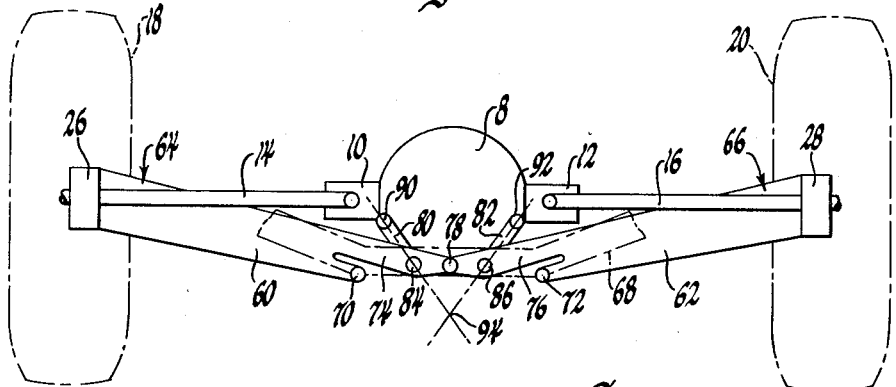
FIG. 5 is a rear end elevation of the construction shown in FIG. 4.
Figure 6:
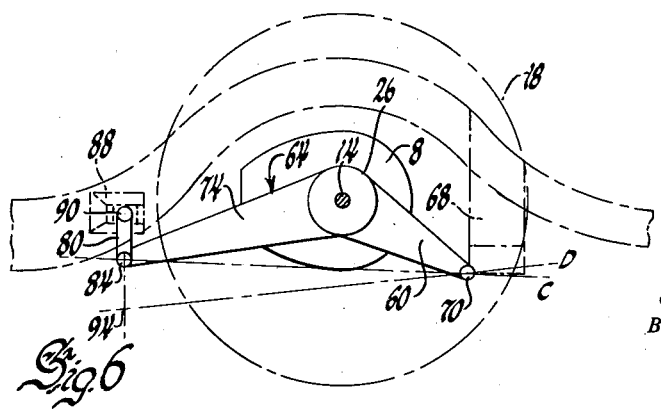
FIG. 6 is a side elevation of the construction of FIGS. 4 and 5.

In FIGS. 4, 5, and 6, there is shown a modification of the invention wherein the rearward legs 60 and 62 of wheel control arm 64 and 66 are directly pivotally connected to frame cross member 68 by ball joints 70 and 72. The forward legs 74 and 76, in turn, are pivotally connected together by a ball joint 78 independent of the sprung mass.

As seen best in FIG. 5, a pair of upwardly extending links 80 and 82 have their lower ends connected to forward legs 74 and 76 slightly outboard of ball joint 78 by pin joints 84 and 86. In the modification, the upper ends of links 80 and 82 are pivotally connected to frame cross member 88 by pin joints 90 and 92 which are located laterally so that the projected axes of the links converge upon an imaginary point 94 located in vertical alignment with but substantially below the common pivotal connection 78. Imaginary point 94 is geometrically equivalent to the actual common pivotal connection 58 at the convergent ends of links 54 and 56 in the embodiments shown in FIGS. 1, 2, and 3; that is, roll motion of the sprung mass occurs about an axis containing this point. In FIG. 6, it will be seen that under conditions of parallel ride and roll deflection, respectively, the effective axis of motion of the wheel control arms 64 and 66 will alternate between imaginary axis C which slopes downwardly toward the rear and imaginary axis D which slopes downwardly toward the front. As in the previous case, each effective axis is an imaginary axis connecting joints 70 and 72, respectively, with joints 84 and 86, respectively, in the case of parallel ride deflection or by an imaginary axis connecting joints 70 and 72, respectively, with the imaginary point 94.

While but one embodiment of the invention has been shown and described, it will be apparent that other changes and modifications may be made therein. It is therefore to be understood that it is not intended to limit the invention to the embodiment shown but only by the scope of the claims which follow.

What is claimed is:
1. In combination with the sprung mass of a vehicle, a pair of laterally oppositely extending control arms each having longitudinally spaced inboard end portions, means pivotally connecting one inboard end of each arm on said sprung mass, the other inboard ends of said arms being pivotally connected together independent of said sprung mass, and means connecting said last mentioned end portions to said sprung mass, said last mentioned means comprising a pair of upwardly extending links pivoted at one end of each to a respective arm outboard of the pivotal connection between said arms, said links converging laterally so that the projected axes thereof intersect at a point vertically aligned with the pivotal connection between said arms, and means pivotally connecting said links at their other ends to said sprung mass.

2. In combination with the sprung mass of a vehicle, a pair of laterally oppositely extending control arms each having longitudinally spaced inboard end portions, means pivotally connecting one inboard end of each arm on said sprung mass, the other inboard ends of said arms being pivotally connected together independent of said sprung mass, and means connecting said last mentioned end portions to said sprung mass, said last mentioned means comprising a pair of links pivoted at one end of each to a respective arm outboard of the pivotal connection between said arms and extending upwardly therefrom in laterally converging relation so that the projected axes thereof intersect at a point above and vertically aligned with the pivotal connection between said arms, and means pivotally connecting said links at their other ends to said sprung mass.

3. In combination with the sprung mass of a vehicle, a pair of laterally oppositely extending control arms each having longitudinally spaced inboard end portions, means pivotally connecting one inboard end of each arm on said sprung mass, the other inboard ends of said arms being pivotally connected together independent of said sprung mass, and means connecting said last mentioned end portions to said sprung mass, said last mentioned means comprising a pair of links pivoted at one end of each to a respective arm outboard of the pivotal connection between said arms and extending upwardly therefrom in laterally diverging relation so that the projected axes thereof intersect at a point below and vertically aligned with the pivotal connection between said arms, and means pivotally connecting said links at their other ends to said sprung mass.

4. In combination with the sprung mass of a vehicle, a pair of laterally opposite extending control arms each having longitudinally spaced inboard end portions, means pivotally connecting the forward inboard end of each arm on said sprung mass at laterally spaced points, the rearward inboard ends of said arms being pivotally connected together independent of said sprung mass, and means connecting said last mentioned end portions to said sprung mass, said last mentioned means comprising a pair of vertically extending links, each link being pivoted at one end of each to one of said arms outboard of the pivotal connection between said arms, the other ends of said links being pivoted together on said sprung mass at a common point vertically aligned with and above the pivotal connection between said arms.

5. The structure set forth in claim 4 wherein the pivotal connection of said forward inboard ends and the pivotal connection between said rearward inboard ends and their associated links define axes of motion for each arm which slope downwardly toward the rear.

6. The structure set forth in claim 4 wherein the axis of motion defined by the pivotal connections of said forward inboard ends and the pivotal connections between said rearward inboard ends and their associated links slope downwardly toward the rear, and the axis of motion defined by the pivotal connection at the forward inboard ends and the common pivotal connection of said links slope downwardly toward the front.

7. The structure set for in claim 5 wherein the axes of motion for said arms converge rearwardly in plan view.

8. The structure set forth in claim 3 wherein the axes of motion defined by the pivotal connections of said rearward inboard ends and the pivotal connections between said forward inboard ends and their associated links slope downwardly toward the rear and the axes of motion defined by the pivotal connections of said rearward inboard ends and the intersection of the projected axes of said links slopes downwardly toward the front.

References Cited in the file of this patent

UNITED STATES PATENTS 2,314,076  Casner ------------------ Mar. 16, 1943